United States Patent [19]

Hoffman

[11] 4,142,315
[45] Mar. 6, 1979

[54] FISHING ROD HOLDER AND HOOK SETTING DEVICE

[76] Inventor: Gary J. Hoffman, 3860 W. 66th St., Arvada, Colo. 80003

[21] Appl. No.: 793,073

[22] Filed: May 2, 1977

[51] Int. Cl.² .............................................. A01K 97/12
[52] U.S. Cl. ......................................................... 43/15
[58] Field of Search ..................................... 43/15, 16

[56] References Cited

U.S. PATENT DOCUMENTS

| 2,461,356 | 2/1949 | Sus et al. | 43/15 |
| 2,482,999 | 9/1949 | Bean | 43/15 |
| 3,014,679 | 12/1961 | Jepson | 43/15 |

FOREIGN PATENT DOCUMENTS 1124821  7/1956  France ......................................... 43/15

Primary Examiner—Nicholas P. Godici
Assistant Examiner—Roscoe V. Parker
Attorney, Agent, or Firm—Ralph F. Crandell

[57] ABSTRACT

A fishing rod holder and hook setting device embodies a fishing rod holder tube mounted for vertical swinging rotation on a support housing adapted to be ground anchored in a fixed position. A ratchet wheel mounted for rotation within the support housing is interconnected with the holder tube by clock springs which, when under tension, tend to rotate the holder tube upwardly toward a vertical position. Catch members adapted for selective engagement with the ratchet wheel are provided to selectively apply a desired tension to the springs by repeated oscillatory rotation of the holder tube. A friction latch releasably retains the holder tube in a downward, relatively horizontal position, against the action of the clock springs. When a downward tension on the holder tube occurs from a pull on the line of a retained fishing rod, the friction latch is released whereby the clock springs swing the tube and thereby the pole upwardly to exert a tug on the fishing line and set the hook in a fish taking the bait on the hook.

13 Claims, 13 Drawing Figures

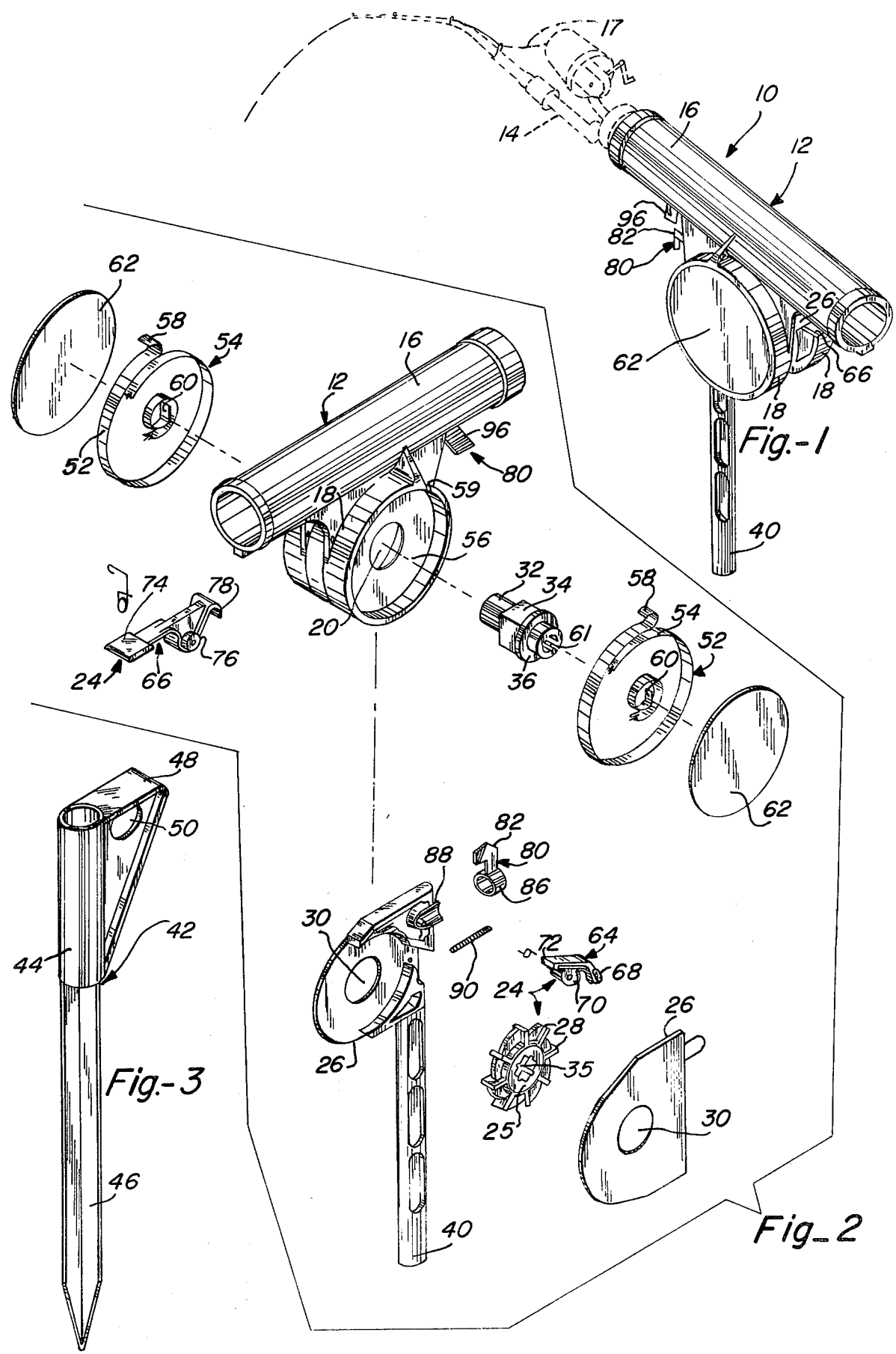

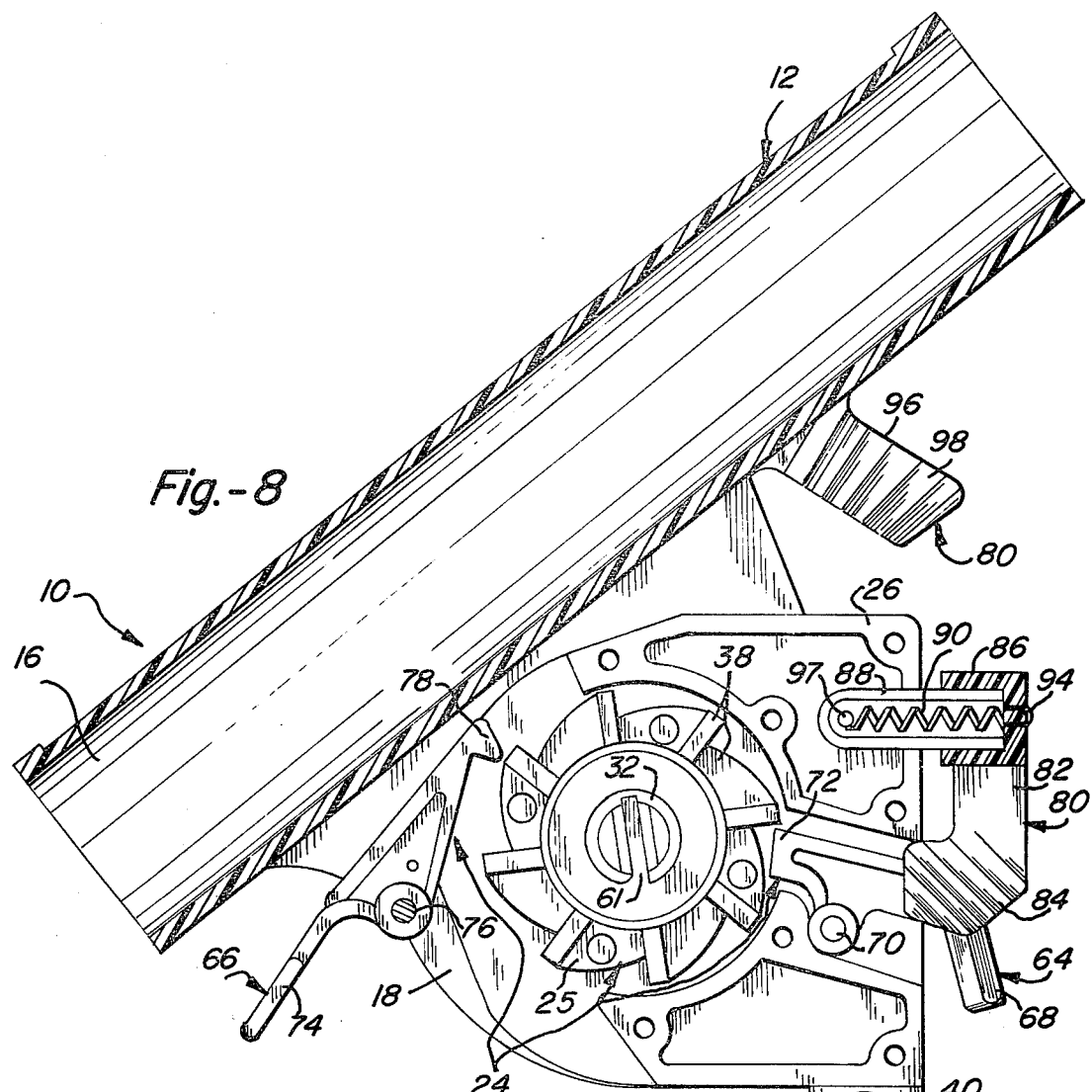

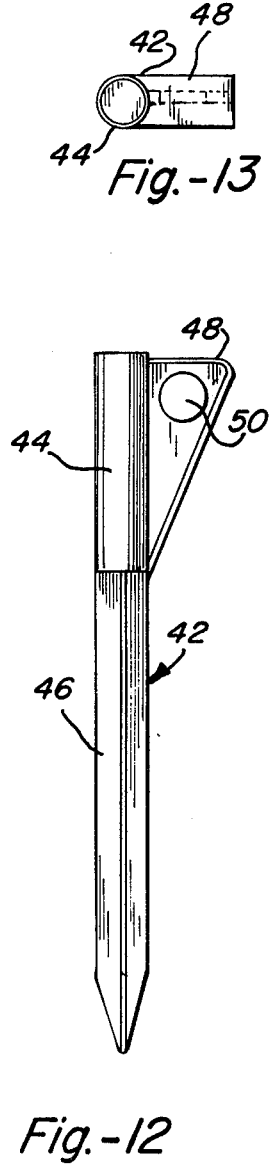
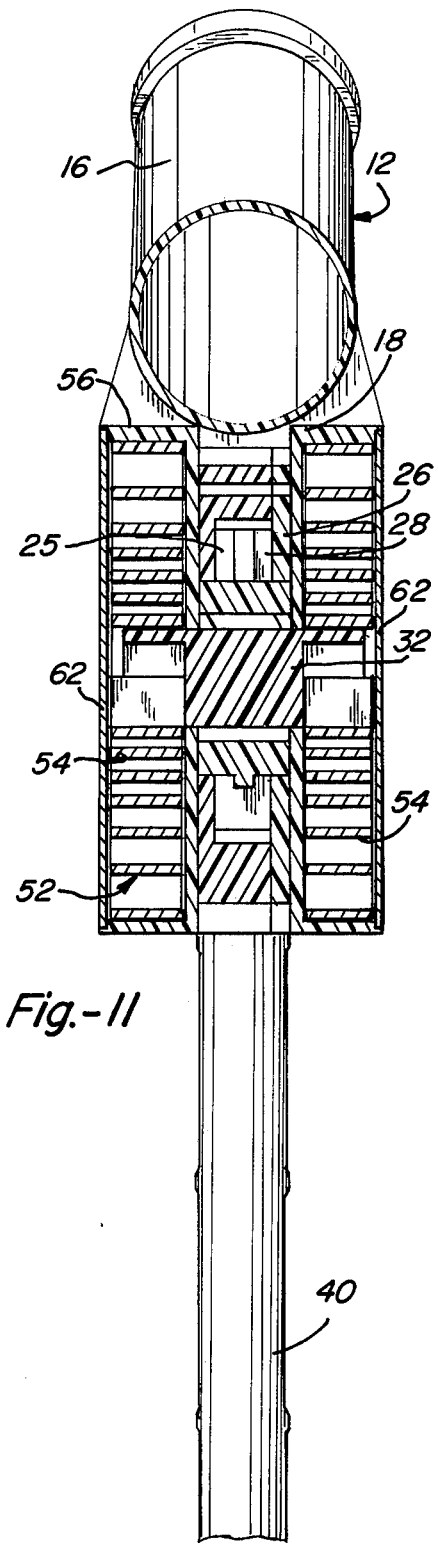
Fig.-13
Fig.-12
Fig.-11

FISHING ROD HOLDER AND HOOK SETTING DEVICE

BACKGROUND OF THE INVENTION

1. Field of the Invention

The present invention relates to fishing rod holders and more particularly to fishing rod holders which automatically set the hook in response to a pull on the fishing line, carried by the rod, and more specifically, the present invention relates to a combination fishing rod holder and hook setting device wherein the fishing line remains tight with the fishing line reel and rod and the line is not connected to the holder in any manner.

2. Prior Art

A wide variety of fishing rod holders which automatically set the hook after a fish has pulled on the fishing line are known to the art. The majority of such devices usually include a holder for the fishing rod, a spring mechanism of some kind, and a triggering apparatus which activates the spring mechanism to move the fishing rod and thereby set the hook. However, many of these devices have various undesirable characteristics or deficiencies such as being overly complicated, difficult to assemble and operate, or expensive to construct. In addition, the fishing rod is not readily removable from the holder in some of these devices, and many of these devices utilize the fishing line in conjunction with the triggering mechanism of the device. Furthermore, many of the trigger or release mechanisms of these devices are not adjustable with respect to the various pulling forces encountered with different sizes and species of fish. See, for example, U.S. Pat. No. 3,722,127, issued on Mar. 27, 1973, to V. A. Atkins, Sr.; U.S. Pat. No. 2,703,465 issued Mar. 8, 1955, to G. A. DiStefano; U.S. Pat. No. 2,784,516, issued Mar. 12, 1957 to Barnes, et al; U.S. Pat. No. 2,804,277, issued Aug. 27, 1957 to H. T. Kinder; U. S. Pat. No. 3,672,085, issued June 27, 1972 to G. W. King; U.S. Pat. No. 3,686,785, issued Aug. 29, 1972 to J. L. Dixon; U.S. Pat. No. 3,699,701, issued Oct. 24, 1972 to L. L. Jacobs; U.S. Pat. No. 3,837,109, issued Sept. 24, 1974, to R. DeJulio; and U.S. Pat. No. 3,724,115, issued Apr. 3, 1973, to C. Derie.

OBJECTS OF THE INVENTION

It is a primary object of the present invention to provide an improved fishing rod holder and hook setting device.

It is another object of the present invention to provide an improved fishing rod holder and hook setting device wherein the fishing line carried by the fishing rod is not attached to or otherwise utilized as a direct part of the device's release mechanism.

A further object of the present invention is to provide an improved fishing rod holder and hook setting device of the foregoing character wherein the tension on the release mechanism of the device is readily adjustable to provide for a response to various pulling forces exerted on the fishing line.

Still another object of the present invention is to provide an improved fishing rod holder and hook setting device of the above type which is simple and practical in construction, efficient and reliable in operation, and inexpensive to manufacture.

Other objects and advantages of the invention will become apparent from the following detailed description taken in connection with the accompanying drawings.

SUMMARY OF THE INVENTION

To achieve the above objects, the present invention is embodied in a fishing rod holder and hook setting device adapted to automatically swing the holder and fishing rod supported thereby in an upwardly direction to set the hook at the end of the fishing line carried by the rod in response to a downward tension on the fishing line and rod caused by a fish taking the bait on the hook. More specifically, the device includes a fishing rod holder for removably supporting the fishing rod, which holder is preferably in the form of a tube to receive the handle of the fishing rod. The holder tube includes two spaced apart depending ears having a common axis about which the holder rotates in a vertical swinging manner.

Interposed between the ears is a support housing which encloses and supports a pawl and ratchet mechanism and in which means are provided for mounting the housing in a fixed position relative to the ratchet wheel and the holder tube. In a preferred form, the support housing is mounted on a depending mounting post which is rotatably received by a tubular ground engaging support stake, and a shaft is provided within the housing to which the ratchet wheel is mounted and about which the ears and holder tube rotate.

To furnish variable rotary tension between the holder tube and the ratchet wheel to achieve the desired movement of the holder tube, two planar coiled clock springs are provided, each spring being disposed within a cavity located on the exterior surface of each ear. The coiled springs are secured within the cavities so as to apply torque to the shaft and thereby rotate the holder tube upwardly from an essentially horizontal position. This is preferably achieved by affixing the outer end of each spring to the ear for rotating the holder tube, while affixing the inner end of each spring to a shaft projecting through the ear for rotation with the ratchet wheel.

To selectively apply tension of any desired degree to the coiled springs, thereby providing an adjustable release tension, a pair of catch members or pawls are provided for selectively engaging the teeth of the ratchet wheel as the holder tube is alternately rotated upwardly and downwardly, the ratchet wheel maintaining the springs in tension when it is so engaged. The first one of the catch members is pivotally mounted to the support housing and prevents rotation of the ratchet wheel when the normally vertical holder tube is rotated in a downwardly direction, toward the horizontal, thereby applying tension to the coiled springs. The second catch member is pivotally mounted between the ears and is adapted to be held in position to engage the ratchet wheel with respect to the holder tube so that when the holder tube is then rotated in an upwardly direction from the horizontal to the vertical, the clock springs is positioned relative to the support housing without changing the tension state of the springs. In this manner, the tension on the clock springs can be adjusted.

Finally, to releasably retain the holder tube in a downwardly, essentially horizontal position against the tendency of the coiled springs to rotate the holder tube upwardly, a friction release latch is provided to selectively interconnect the holder tube and the support housing. The release latch preferably includes a latch member pivotally affixed to the support housing and a tab depending from the holder tube. Both the latch member and the tab have a friction gripping surface which, when engaged with each other, maintain the holder tube in the downward position. The friction force between the latch member and the tab is directly dependent upon the tension applied to the coiled springs so that the greater the spring tension, the greater the friction force which holds the latch member and tab together. When a downward tension is exerted on the downwardly held fishing rod and holder tube sufficient to overcome the friction force between the latch member and the tab, the latch member automatically disengages from the tab allowing the coiled springs to quickly rotate the holder tube upwardly to an essentially vertical position thereby setting the hook.

BRIEF DESCRIPTION OF THE DRAWINGS

FIG. 1 is a perspective view of a fishing pole holder embodying the present invention.

FIG. 2 is an exploded perspective view illustrating the various components of the fishing pole holder embodying the present invention.

FIG. 3 is a perspective view of a ground engaging support element utilized for anchoring the fishing pole holder to the ground.

FIG. 8 is a section view of the present invention similar to FIG. 7 but with the release latch mechanism unsecured and the holder tube in a partially upright position.

FIG. 9 is an enlarged, fragmentary front elevation view of the support housing and holder tube of the present invention with the release latch mechanism in a secured position.

FIG. 10 is a view similar to FIG. 9 but with the release mechanism in an unsecured position.

FIG. 11 is an enlarged section view taken substantially in the plane of line 11—11 of FIG. 6.

FIG. 12 is a side elevation view of the ground engaging support element utilized for anchoring the present invention to the ground.

FIG. 13 is a top plan view of the ground engaging support element shown in FIG. 12.

DETAILED DESCRIPTION OF THE PREFERRED EMBODIMENT

Figures 4, 5, 6:
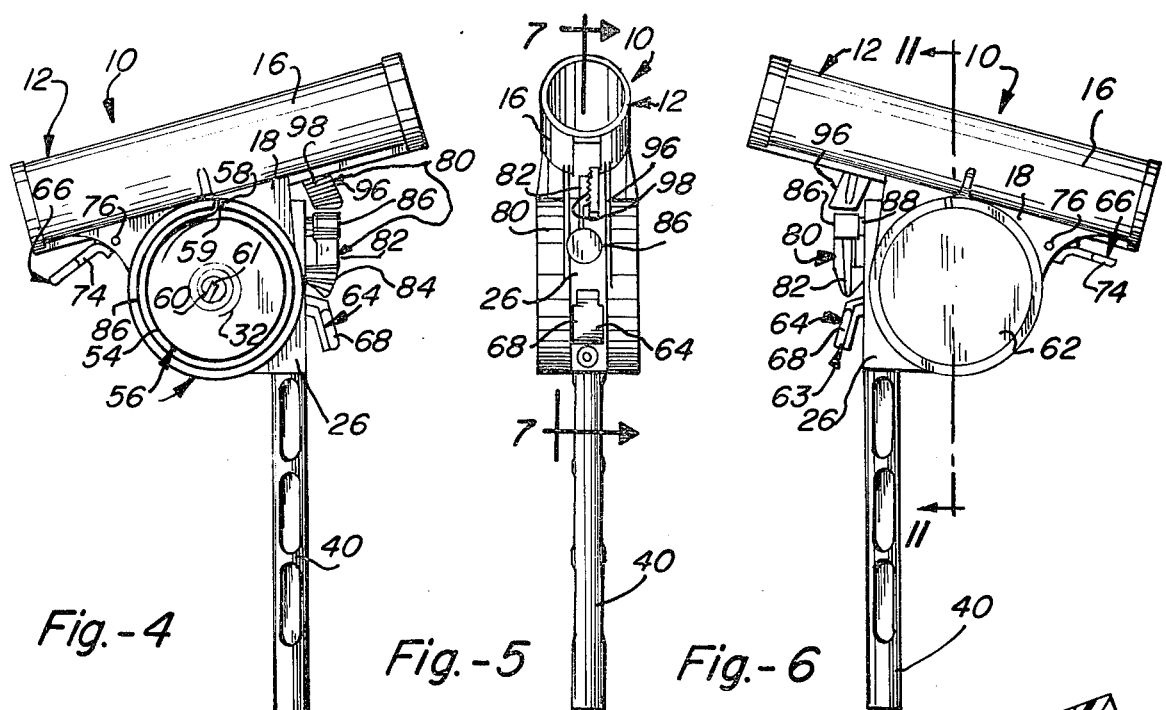
FIG. 4 is a side elevation view of the invention with the holder tube in its downward, essentially horizontal position and with the release latch mechanism unsecured.
FIG. 5 is a front elevation view of the present invention with the holder tube in its downward, essentially horizontal position and the release latch mechanism in a secured position.
FIG. 6 is a side elevation view of the present invention similar to FIG. 4 but of the opposite side thereof.
Figure 7:
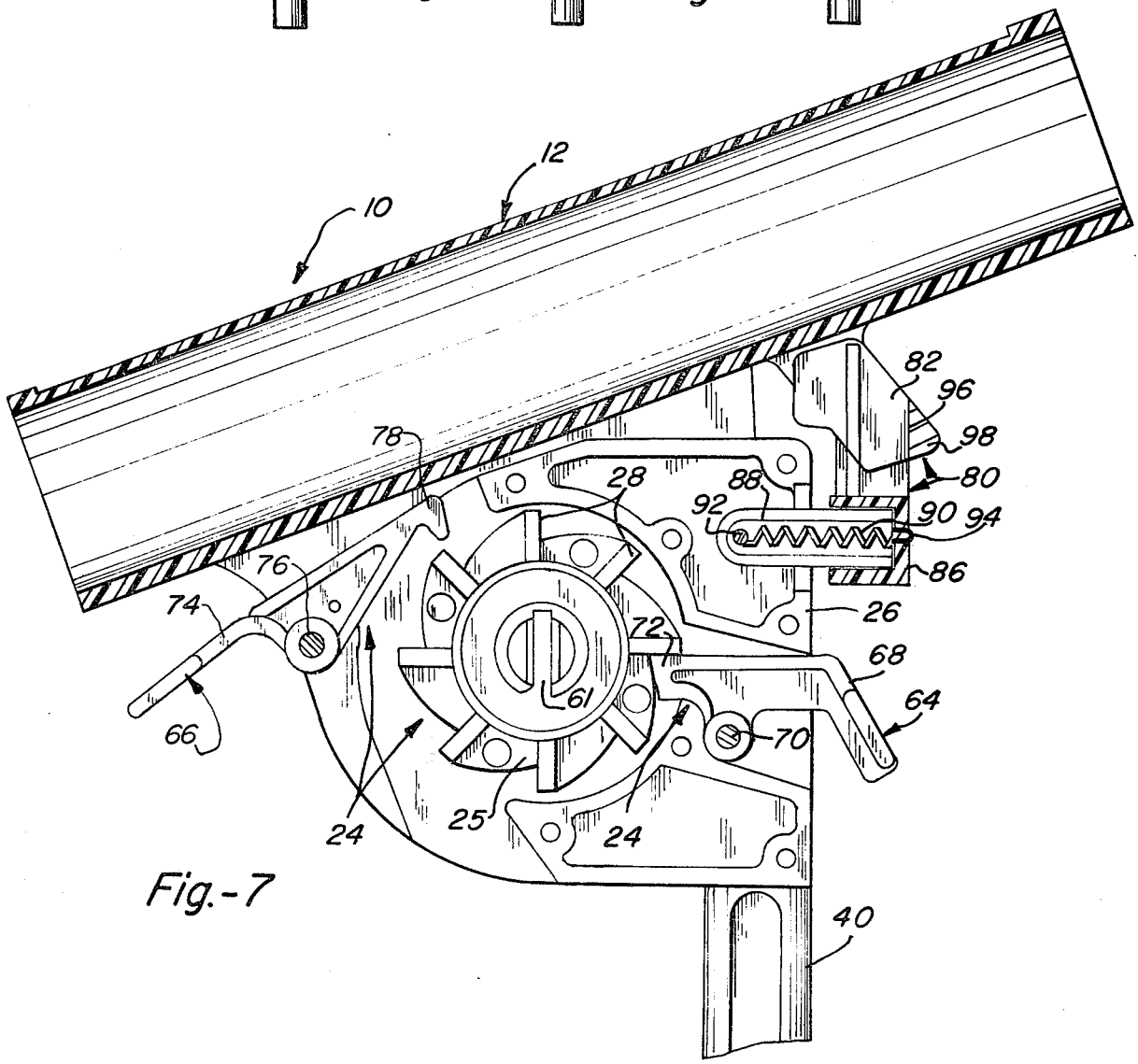
FIG. 7 is an enlarged, vertical section view taken substantially in the plane of line 7—7 on FIG. 5.

Referring to the drawings, and with particular reference to FIGS. 1 and 2, a fishing rod holder and hook setting device 10 embodying the present invention includes a holder 12 for supporting a fishing rod 14. Preferably, the holder 12 comprises a tube 16 for receiving the handle of the fishing rod 14. This configuration permits easy and rapid removal of the fishing rod 14 from the tube 16 once the hook at the end of fishing line 17 carried by rod 14 has been set. The holder and setting device 10 is adapted to automatically swing the tube 16 and the fishing rod 14 in an upwardly direction toward the vertical to set the hook carried on the fishing line 17 in a fish in response to a downward tension on the fishing rod 14 and the tube 16 caused by the fish taking the bait on the hook. To achieve this movement, the tube 16 includes two spaced apart depending ears 18 which have a common axis about which the tube 16 and the ears 18 rotate, the ears 18 having coaxial aligned openings 20 along this axis of rotation.

Interposed between the ears 18, to provide a support about which the tube 16 is rotated and to enclose and support a pawl and ratchet mechanism 24 for cocking the holder and setting device 10, is a support housing 26. The pawl and ratchet mechanism 24 comprises a ratchet wheel 25 mounted for rotation within the support housing 26, and including slanted teeth 28, a first catch member or pawl 64, and a second catch member or pawl 66, the ratchet wheel 25 and the support housing 26 having coaxially aligned openings 30 along the common axis of the aligned openings 20. A shaft 32 extends through the aligned openings 20 and 30 and is rotatable relative to the support housing 26 and the ears 18. The shaft 32 also is provided with a square mount 34, received in a rectangular opening 35 in the ratchet wheel 25 so that the ratchet wheel 25 rotates with the shaft 32. Collar 36 is provided on the shaft 32 to maintain the shaft 32 in position within the support housing 26.

Referring to FIGS. 2, 3, 12 and 13, to securely mount the support housing 26 in position for fishing, a mounting post 40 depends downwardly from the support housing 26 and is rotatably received by a ground engaging support element 42. The support element 42 is preferably in the form of a stake and comprises an upper tubular stake portion 44 adapted to receive the mounting post 40 which is freely rotatable therewithin, and a lower stake portion 46 for insertion into the ground. A foot bracket 48 is secured to the upper tubular portion 44 of the support element 42 to aid in inserting the lower stake portion into the ground. A finger hole 50 is provided in the bracket 48 to aid in removing the support element 42 from the ground. It should be noted that the support housing 26 may be securely mounted in a fixed position in any manner, such as being mounted on a boat wherein the support element 42 would be adapted for attachment to the side of the boat.

With references to FIGS. 2, 4, and 11, springs 52 provide variable rotary tension between the ratchet wheel 25 and the tube 16 so as to tend to rotate the tube 16 upwardly toward a vertical position. In the illustrated embodiment, springs 52 comprise two planer coiled clock springs 54 disposed within cavities 56 defined on the exterior surface of each ear 18. The clock springs 54 are in substantially coaxial alignment with the ratchet wheel 25 and the ears 18. The outer end 58 of each clock spring 54 is affixed in a slot 59 in the edge of the cavity 56 so as to rotate the ear 18 and the tube 16. The inner end 60 of each coiled spring 54 is attached in a slot 61 provided in each end of the shaft 32 so as to rotate with the ratchet wheel 25. The orientation of the coiled clock springs 54 within the cavities 56 is such that when the clock springs 54 are wound and placed under tension, the springs 54 tend to rotate the tube 16 upwardly from an essentially horizontal position when the ratchet is held in a fixed position relative to the support housing 26 by a catch member or panel 64 on the housing 26. Spring cover plates 62 are disposed over the cavities 56 so as to enclose the clock springs 54 therewithin.

Turning now to FIGS. 1, 2, 4, and 6 through 8, a pair of catch members or pawls 64 and 66 are provided to selectively apply any desired tension to the clock springs 54 thereby providing an adjustable release tension for the holder and setting device 10. To accomplish this, the catch members 64 and 66 selectively engage the teeth 28 of the ratchet wheel 25. The first catch member 64 includes a trigger lever 68 pivotally mounted by a pin 70 to the support housing 26. At the interior end of the lever 68 is a tongue 72 which selectively engages the teeth 28 of the ratchet wheel 25 to prevent rotation of the ratchet relative to the housing 26, when the tube 16 is rotated in a downwardly direction, thereby applying tension to the coiled clock springs 54 which tends to swing the holder 12 upwardly. A second catch member 66 includes a trigger lever 74 pivotally mounted by a pin 76 between the ears 18. The trigger lever 74 has at its interior end a tongue 78 for selective engagement with the teeth 28 of the ratchet wheel 25, and which rotates the ratchet wheel 25 simultaneously with the tube 16 when the tube 16 is rotated in an upwardly direction, thereby rotating the clock springs 54 relative to the stationary support housing 26 without affecting the state of tension of the springs 54. Thus, to cock the holder and setting device 10 and to apply the desired tension to the clock springs 54, the first catch member 64 engages the teeth 28 while the tube 16 is rotated downwardly to apply tension to the springs 54. Then, the trigger lever 74 of the second catch member 66 is pulled downwardly so as to engage the tongue 78 with the teeth 28. The second catch member 66 being so engaged, the tube 16 is rotated upwardly toward a vertical position which rotates both the ratchet wheel 25 and the coiled clock springs 54 as a unit so as not to alter or affect the tension on the springs 54. When the tube 16 reaches an essentially vertical position, the first catch member 64 is engaged with the teeth 28 of the ratchet wheel 25, and the procedure is repeated until the desired tension has been placed on the clock springs 54. The device 10 has then been cocked and is prepared for setting.

To set the holder and setting device 10 after having been cocked, the tube 16 is releasably retained in a downwardly, essentially horizontal position against the tendency of the springs 54 to rotate the tube 16 upwardly. To retain the tube 16 in such a position, a friction release latch 80 is provided to releasably secure the tube 16 to the support housing 26. Once the holder and setting device 10 is so set, and a downward tension on the fishing rod 14 and the tube 16 occurs, the friction release latch 80 is released, thereby allowing the clock spring 54 to rotate the tube 6 upwardly to set the hook. The downward tension on the fishing rod 14 required to release the friction release latch 80 will vary according to the amount of tension which has been selectively imposed on the springs 54 as described in more detail below.

With reference to FIGS. 1, 2, and 4 through 10, the friction release latch 80 includes a latch member 82 pivotally mounted to the support housing 26 for rotation about an axis substantially perpendicular to the rotational axis of the tube 16 and the ratchet wheel 25. The latch member 82 has a friction gripping surface preferably in the form of grooved or notched surface 84 on one face of one end thereof and an annular flange 86 on the opposite end to form a pivot point. Tube 88 extends outwardly from the support housing 26 and is inserted within the flange 86. A spiral torsion spring 90 is disposed within the tube 88 and is secured at one end 92 within the tube 88 and at its other end 94 to the center of the annular flange 86. The torsion spring 90 is coaxial with the axis of rotation of the latch member 82 and is oriented within the tube 88 so as to tend to pivot the latch member 82 downwardly away from the tube 16 as shown in FIG. 8. The tension of the torsion spring 90 may be adjusted by pulling the latch 82 outwardly and rotating the same relative to the housing 26.

To secure the latch member 82 to the tube 16, the friction release latch 80 also includes a tab member 96 depending downwardly from the tube 16. The tab 96 also has a friction gripping surface preferably in the form of grooved or notched surface 98 on one face thereof. The grooved surfaces 84 and 98 are disposed respectively on the latch member 82 and the tab 96 so as to face each other when the latch member 82 is in a pivoted upright position. When the tube 16 is in a downward, essentially horizontal position, and the latch member 82 is in a pivoted upright position, the grooves or notches on the friction gripping surfaces 84 and 98 interlock with each other, and since the springs 54 are applying tension to the tube 16 when the tube 16 is in such a position, the grooved surfaces 84 and 98, when interlocked, are maintained in this position by friction therebetween so as to retain the tube 16 in the downwardly, essentially horizontal position. The friction force or release tension between the gripping surfaces 84 and 98 is directly dependent on the tension of the coiled springs 54 so that the greater the tension applied to the springs 54, the greater the friction force or release tension which holds the latch member 82 and the tab 96 together.

When a downward tension imposed on the fishing rod 14 and the tube 16 resulting from a fish pulling on the fishing line 17 overcomes the friction force between the latch member 82 and the tab 96 created by the springs 54, the rotational force from the torsion spring 90 forces the latch member 82 to disengage from the tab 96 and pivot downwardly. This releases the tube 16, and the coiled clock springs 54 quickly rotate the tube 16 upwardly to an essentially vertical position, thereby pulling on the line and setting the hook in the fish.

As can be seen from the above, the present invention is not overly complicated and is easy to assemble and operate. Furthermore, the present invention is not particularly expensive to construct inasmuch as all of the components thereof, except for the coiled springs 54 and the torsion spring 90, may be formed from injection molded plastic. Also, the present invention provides for easy and rapid removal of the fishing rod from the device, and the fishing line carried by the fishing rod remains tight with the fishing reel and is not utilized as a part of the triggering or releasing mechanism. Finally, the release tension or force of the friction release latch can be varied and is readily adjustable for various fishing conditions, size and species of fish, and areas to be fished, by merely applying the desired tension to the coiled clock springs. Furthermore, the angle of the tube may be varied by engaging the grooved surface of the latch member along any portion of the grooved surface of the holder tube tab, for it is not necessary that the entire grooved surface of the latch member be engaged with the entire grooved surface of the tab member.

While a certain illustrative embodiment of the present invention has been shown in the drawings and described in considerable detail, it should be understood that there is no intention to limit the invention to the specific form disclosed. On the contrary, the intention is to cover all modifications, alternative constructions, equivalents, and uses falling within the spirit and scope of the invention as expressed in the appended claims.

What is claimed is:

1. A fishing rod holder and hook setting device adapted to automatically move said holder and fishing rod supported thereby upwardly to set the hook in response to a downward tension on said fishing rod comprising:

means for releasably holding a fishing rod; a housing adapted for supporting said rod holding means for vertical swinging rotation thereabout;

a pawl and ratchet mechanism including a ratchet wheel rotatably supported and substantially enclosed by housing;

a shaft coupled with said pawl and ratchet mechanism and about which said rod holding means rotates, said shaft extending through said housing;

means for mounting said housing in a fixed position relative to said rod holding means;

means for providing variable resilient tension between said rod holding means and said pawl and ratchet mechanism, said resilient tension means tending to rotate said rod holding means upwardly;

said pawl and ratchet mechanism further including first and second catch members, said first catch member being mounted to said housing for selective engagement with said ratchet wheel to prevent, when so engaged, rotation of said ratchet wheel when said rod holding means is rotated in a downwardly direction, and said second catch member being mounted to said rod holding means for selective engagement with said ratchet wheel to rotate, when so engaged, said ratchet wheel simultaneously with said rod holding means when said rod holding means is rotated in an upwardly direction, whereby said pawl and ratchet mechanism provides (adapted to permit) selective adjustment of the tension provided by said resilient tension means; and means for releasably retaining said rod holding means in a downward, essentially horizontal position against the tendency of said resilient tension means to rotate said rod holding means upwardly.

2. A fishing rod holder and hook setting device adapted to automatically move said holder and fishing rod supported thereby upwardly to set the hook in response to a downward tension on said fishing rod comprising:

means for detachably holding a fishing rod; spaced apart ears depending from said rod holding means, said rod holding means being adapted to rotate about the common axis of said ears;

a support housing interposed between said ears;

a ratchet wheel mounted for rotation within said support housing;

means for mounting said support housing in a fixed, non-rotatable position relative to said ratchet wheel and said rod holding means;

a shaft extending through said ratchet wheel, said support housing and said ears;

means for providing variable resilient tension between said ratchet wheel and said rod holding means, said resilient tension means tending to rotate said rod holding means upwardly;

a first catch member pivotally mounted to said support housing for selective engagement with said ratchet wheel and adapted, when so engaged, to prevent rotation of said ratchet wheel when said rod holding means is rotated in a downwardly direction thereby applying tension to said resilient means;

a second catch member pivotally mounted to said rod holding means for selective engagement with said ratchet wheel and adapted, when so engaged, to rotate said ratched wheel simultaneously with said rod holding means when said rod holding means is rotated in an upwardly direction thereby rotating said resilient means relative to said support housing without altering the tension state of said resilient means, said first and second catch members permitting variable tension to be selectively applied to said resilient means; and means for releasably retaining said rod holding means in a downward, essentially horizontal position against the tendency of said resilient means to rotate said rod holding means upwardly, said retaining means releasing said rod holding means in response to a downward tension on said rod holding means thereby allowing said resilient means to rotate said rod holding means upwardly to set the hook.

3. The fishing rod holder as defined in claim 2, wherein said shaft extends through coaxially aligned openings disposed in said ratchet wheel, said support housing and said ears to provide a pivot mount for said ratchet wheel while being rotatable relative to said ears and said support housing, said resilient means being affixed to said shaft and said ears to interconnect said ratchet wheel and said rod holding means so as to produce torque on said shaft when said resilient means is under tension.

4. The fishing rod holder as defined n claim 2, wherein a cavity is provided on the exterior surface of each ear, and wherein said resilient means comprises two planar coiled clock springs, each said spring being disposed within a said cavity, the outer end of each said spring being secured to said cavity for rotation with said rod holding means and the inner end of each said spring being secured to said shaft for rotation with said ratchet wheel.

5. The fishing rod holder as defined in claim 2, wherein said ratchet wheel maintains said resilient means in tension when engaged with said first or said second catch member, said ratchet wheel enabling variable tension to be applied to said resilient means to vary the downward tension on said rod holding means required to release said rod holding means from said retaining means.

6. The fishing rod holder as defined in claim 2, wherein said retaining means comprises a friction latch member securable to a tab depending from said rod holding means, said latch member being pivotally mounted to said support housing by a torsion spring for rotation about an axis substantially perpendicular to the rotational axis of said rod holding means and said ratchet wheel, said torsion spring tending to maintain said latch member in an unsecured position with said tab, said latch member and said tab each having a gripping surface for mutual engagement to secure said latch member to said rod holding means, said gripping surfaces disengaging and said latch member pivoting downwardly upon application of sufficient downward tension on said rod holding means to overcome the friction force between said gripping surfaces.

7. The fishing rod holder as defined in claim 2, wherein each said catch member comprises a pivotally mounted trigger lever having a tongue end for engagement with the teeth of said ratchet wheel, said second catch member being pivotally mounted between said ears.

8. The fishing rod holder as defined in claim 2, wherein said rod holding means comprises a tube for receiving the handle of said fishing rod, and wherein said mounting means comprises a mounting post depending from said support housing adapted for insertion into a ground engaging support element.

9. A fishing rod holder and hook setting device adapted to automatically move said holder and fishing rod supported thereby upwardly to set the hook in response to a downward tension on said fishing rod comprising:
- means for detachably holding a fishing rod; spaced apart ears depending from said rod holding means, said rod holding means being adapted to rotate about the common axis of said ears;
- a support housing disposed between said ears;
- a ratchet wheel mounted for rotation within said support housing with said ratchet wheel, said support housing, and said ears cooperatively providing aligned axial openings therewithin;
- means for mounting said support housing in a fixed position against rotation;
- a shaft extending through said aligned openings to provide a pivot mount for said ratchet wheel while being rotatable relative to said ears and said support housing;
- planar coiled clock springs for providing variable rotary tension between said rod holding means and said ratchet wheel, the outer end of each said coiled spring being affixed to said ears for rotation with said rod holding means, and the inner end of each said spring being affixed to said shaft for rotation with said ratchet wheel, said coiled springs applying torque to said shaft and tending to rotate said rod holding means upwardly when placed under tension;
- a first catch member pivotally mounted to said support housing for selective engagement with said ratchet wheel and adapted, once so engaged, to prevent rotation of said ratchet wheel when said rod holding means is rotated in a downwardly direction, thereby applying tension to said springs;
- a second catch member pivotally mounted to said rod holding means for selective engagement with said ratchet wheel and adapted, once so engaged, to rotate said ratchet wheel simultaneously with said rod holding means when said rod holding means is rotated in an upwardly direction, thereby rotating said coiled springs relative to said support housing without altering the tension state of said springs, said first and second catch members permitting variable tension to be selectively applied to said coiled springs, and said ratchet wheel maintaining said springs under tension when engaged with said first or second catch members; and
- a friction latch member pivotally mounted to said support housing and releasably securable to said rod holding means, said latch member adapted to retain said rod holding means, when secured thereto, in a downward, essentially horizontal position against the tendency of said springs to rotate said rod holding means upwardly, said latch member being released from said rod holding means in response to a downward tension on said fishing rod and said rod holding means thereby allowing said springs to rotate said rod holding means upwardly to set the hook, the downward tension on said fishing rod required to release said latch member varying according to the tension on said springs.

10. The fishing rod holder as defined in claim 9, wherein said latch member is pivotally mounted to said support housing by a torsion spring for rotation about an axis substantially perpendicular to the rotational axis of said rod holding means and said ratchet wheel, said torsion spring tending to maintain said latch member in an unsecured position with said rod holding means, and wherein a tab depends from said rod holding means having a grooved gripping surface adapted for engagement with a grooved gripping surface disposed on said latch member to secure said latch member to said tab, said grooved surfaces disengaging and said latch member pivoting downwardly upon application of sufficient downward tension on said fishing rod and said rod holding means to overcome the friction force between said grooved surfaces.

11. The fishing rod holder as defined in claim 9, wherein a cavity is provided on the exterior surface of each said ear, wherein each said coiled clock spring is disposed within one said cavity, and wherein each said catch member comprises a pivotally mounted trigger lever having a tongue end for engagement with said ratchet wheel, said second catch member being mounted pivotally between said ears, and said first catch member being adapted to release said latch member by application of sufficient pressure to the trigger lever thereof.

12. The fishing rod holder as defined in claim 9, wherein said rod holding means comprises a tube for receiving the handle of said fishing rod, and wherein said mounting means comprises a mounting post depending from said support housing adapted for insertion into a ground engaging support element.

13. A fishing rod holder and hook setting device adapted to automatically move said holder and fishing rod supported thereby upwardly toward a vertical position to set the hook in response to a downward pull on said fishing rod comprising:
- a fishing rod holder tube for receiving the handle of a fishing rod and having two depending ears, each said ear having a cavity disposed on its exterior surface, said holder tube being adapted to rotate about the common axis of said ears;
- a support housing disposed between said ears;
- a ratchet wheel having slanted teeth and mounted for rotation within said support housing, said ratchet wheel, said support housing and said ears cooperatively providing aligned axial openings therewithin;
- a shaft extending through said aligned axial openings to provide a pivot mount for said ratchet wheel while remaining rotatable relative to said ears and said support housing;
- a mounting post depending from said support housing;
- a ground engaging support element adapted for insertion into the ground and for receiving said mounting post to secure said support housing in a fixed, non-rotatable position relative to said ratchet wheel and said holder tube;
- two planar coiled clock springs for providing variable rotary tension between said holder tube and said ratchet wheel, each said coiled spring being disposed in an ear cavity with the outer end of each said coiled spring being affixed to said cavity for rotation with said holder tube and the inner end affixed to said shaft for rotation with said ratchet wheel, said coiled springs applying torque to said shaft and tending to rotate said holder tube upwardly when placed under tension;

a first catch member having a trigger lever pivotally mounted to said support housing and a tongue end for selective engagement with the teeth of said ratchet wheel, said first catch member, when engaged with said ratchet wheel, preventing rotation of said ratchet wheel when said holder tube is rotated in a downwardly direction, thereby applying tension to said coiled springs;

a second catch member having a trigger lever pivotally mounted between said ears and a tongue end for selective engagement with the teeth of said ratchet wheel, said second catch member, when engaged with said ratchet wheel, rotating said ratchet wheel simultaneously with said holder tube when said holder tube is rotated in an upwardly direction, thereby rotating said coiled springs relative to said support houding without altering the tension state of said coiled springs, said first and second catch members permitting variable tension to be selectively applied to said coiled springs, and said ratchet wheel maintaining said coiled springs in tension when engaged with said first or second catch members;

a tab depending from said holder tube and having a grooved gripping surface on one side thereof; and a latch member adapted to maintain said holder tube in a downward, essentially horizontal position against the tendency of said coiled springs to rotate said holder tube upwardly, said latch member having a grooved gripping surface on one side thereof and being pivotally mounted to said support housing by a torsion spring for rotation about an axis substantially perpendicular to the rotational axis of the said holder tube and said ratchet wheel, said torsion spring tending to rotate said latch member downwardly and maintain said latch member in an unsecured position with said tab, the grooved surface of said tab being adapted for engagement with the grooved surface of said latch member to maintain the holder tube in said downward position, said grooved surfaces disengaging and said latch member pivoting downwardly in response to a downward pull on said fishing rod and said holder tube thereby allowing said coiled springs to rotate said holder tube upwardly to set the hook, the downward pull on said fishing rod and said holder tube required to release said latch member from said tab varying in accordance with the tension on said coiled springs.

* * * * *